(12) United States Patent
Morris et al.

(10) Patent No.: US 8,444,387 B2
(45) Date of Patent: May 21, 2013

(54) SEAL PLATES FOR DIRECTING AIRFLOW THROUGH A TURBINE SECTION OF AN ENGINE AND TURBINE SECTIONS

(75) Inventors: Mark C. Morris, Phoenix, AZ (US); Larry Barr, Tempe, AZ (US); Paul Couey, Tempe, AZ (US); Stuart Andrew Harman, Sun City, AZ (US); Douglas L. Ramerth, Chandler, AZ (US); Luis A. Tapia, Maricopa, AZ (US)

(73) Assignee: Honeywell International Inc., Morristown, NJ (US)

( * ) Notice: Subject to any disclaimer, the term of this patent is extended or adjusted under 35 U.S.C. 154(b) by 1126 days.

(21) Appl. No.: 12/622,837

(22) Filed: Nov. 20, 2009

(65) Prior Publication Data

US 2011/0123325 A1 May 26, 2011

(51) Int. Cl.
*B63H 1/14* (2006.01)

(52) U.S. Cl.
USPC .................................. 416/96 R; 416/97 R

(58) Field of Classification Search ................. 415/115, 415/116, 208.1; 416/96 R, 97 R
See application file for complete search history.

(56) References Cited

U.S. PATENT DOCUMENTS

| | | | |
|---|---|---|---|
| 2,988,325 A * | 6/1961 | Dawson | 415/110 |
| 3,814,539 A | 6/1974 | Klompas | |
| 4,854,821 A | 8/1989 | Kernon et al. | |
| 5,143,512 A | 9/1992 | Corsmeier et al. | |
| 5,275,534 A | 1/1994 | Cameron et al. | |
| 5,333,993 A | 8/1994 | Stueber et al. | |
| 5,816,776 A | 10/1998 | Chambon et al. | |
| 6,641,363 B2 | 11/2003 | Barrett et al. | |
| 7,503,748 B2 | 3/2009 | Ferra et al. | |
| 2009/0110561 A1 | 4/2009 | Ramerth et al. | |

* cited by examiner

*Primary Examiner* — Dwayne J White
(74) *Attorney, Agent, or Firm* — Ingrassia Fisher & Lorenz, P.C.

(57) ABSTRACT

A seal plate for directing an airflow includes a hub, main pumping vanes, and splitter vanes. The hub has a tubular section and an annular flange section flared outwardly relative to the tubular section to define a flow surface. The main pumping vanes are disposed circumferentially on the flow surface around the annular flange section and each has a canted section located radially inward relative to a straight section and aligned with a flow direction of the airflow. The straight section extends along a first plane including a centerline of the seal plate. The splitter vanes are disposed circumferentially on the flow surface around the annular flange section such that at least one splitter vane is disposed between the straight sections of two adjacent main pumping vanes. Each splitter vane has a length that is less than a length of each of the two adjacent main pumping vanes.

19 Claims, 3 Drawing Sheets

SEAL PLATES FOR DIRECTING AIRFLOW THROUGH A TURBINE SECTION OF AN ENGINE AND TURBINE SECTIONS

TECHNICAL FIELD

The inventive subject matter generally relates to turbine engines and more particularly relates to seal plates for directing airflow through turbine sections of an engine.

BACKGROUND

Turbine engines are used as a primary power source for various kinds of vehicles. Most turbine engines generally follow the same basic power generation procedure. Air is ingested into a fan section, and passes over stator vanes that direct the air into a compressor section to be compressed. The compressed air is flowed into a combustor, mixed with fuel, burned, and directed at a relatively high velocity into a turbine section. The turbine section, which includes one or more turbines each made up of disks and blades extending therefrom, receives the hot gases via stationary blades. The stationary blades turn the gas flow partially sideways to impinge on blades mounted on a rotatable turbine disk. The force of the impinging gas causes the turbine disk to spin at high speeds to produce power.

During operation, the blades of the turbine section are cooled by cooling air diverted from the compressor section. The cooling air flows into a stationary Tangential On Board Injector (TOBI) which then directs the cooling air into holes formed in a coverplate attached to a disk of one of the turbines. The cooling air is contained within the turbine section by labyrinth seals and may flow into a space between the coverplate and the disk. After flowing into the space, the cooling air may flow into a plurality of cooling passages formed between the blades and corresponding slots in the disk. Subsequently, the cooling air enters cooling holes formed in the turbine blades to thereby cool the blades.

Cooling effectiveness of the blades may depend on an amount of cooling air and a pressure level at which the cooling air is supplied. In conventional engines, straight radial pumping vanes have been incorporated between the coverplate and the disk to increase air flow rate and to elevate the pressure of the air. However, as the demand for improved engine efficiency has increased, components of the engine have been subjected to higher temperatures. Consequently, the aforementioned configurations for cooling the components may not be adequate, and the turbine blades may have shortened useful lives.

Accordingly, it is desirable to have an improved blade cooling configuration that may be used to cool blades in turbine engines having increased efficiency. Additionally, it is desirable for the improved blade cooling scheme to be simple and relatively inexpensive to employ. Moreover, it is desirable for the improved blade cooling scheme to be capable of being retrofitted into existing engines. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Seal plates and turbine sections of engines are provided.

In an embodiment, by way of example only, a seal plate for directing an airflow through a turbine section of an engine is provided. The seal plate includes a hub, a plurality of main pumping vanes, and a plurality of splitter vanes. The hub has a tubular section and an annular flange section flared outwardly relative to the tubular section. The annular flange section defines a flow surface. The plurality of main pumping vanes is disposed circumferentially on the flow surface around the annular flange section of the hub. Each main pumping vane has a canted section and a straight section. The canted section is located radially inward relative to the straight section and is aligned with a flow direction of the airflow. The straight section extends along a first plane extending through a centerline of the seal plate. The plurality of splitter vanes is disposed circumferentially on the flow surface around the annular flange section of the hub such that at least one splitter vane is disposed between the straight sections of two adjacent main pumping vanes. Each splitter vane has a length that is less than a length of each of the two adjacent main pumping vanes.

In another embodiment, by way of example only, a turbine section of an engine includes a seal plate, a turbine disk, and a plurality of blades. The seal plate includes a hub having a tubular section and an annular flange section flared outwardly relative to the tubular section, the annular flange section defining a flow surface, a plurality of main pumping vanes disposed circumferentially on the flow surface around the annular flange section of the hub, each main pumping vane having a canted section and a straight section, the canted section located radially inward relative to the straight section and aligned with a flow direction of the airflow, and the straight section lying in a first plane which includes a centerline of the seal plate, and a plurality of splitter vanes disposed circumferentially on the flow surface around the annular flange section of the hub such that at least one splitter vane is disposed between straight sections of two adjacent main pumping vanes, each splitter vane having a length that is less than a length of each of the two adjacent main pumping vanes. The turbine disk is spaced apart from the seal plate and has a first side, a second side, an outer radial section, and a plurality of disk slots. The outer radial section includes a rim, and the plurality of disk slots extend radially inwardly from the rim of the disk. Each blade includes a blade attachment portion, and each blade attachment portion is disposed in a corresponding blade attachment slot such that when the blade is disposed in the corresponding blade attachment slot, a cooling air passage between the blade and the turbine disk is defined.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
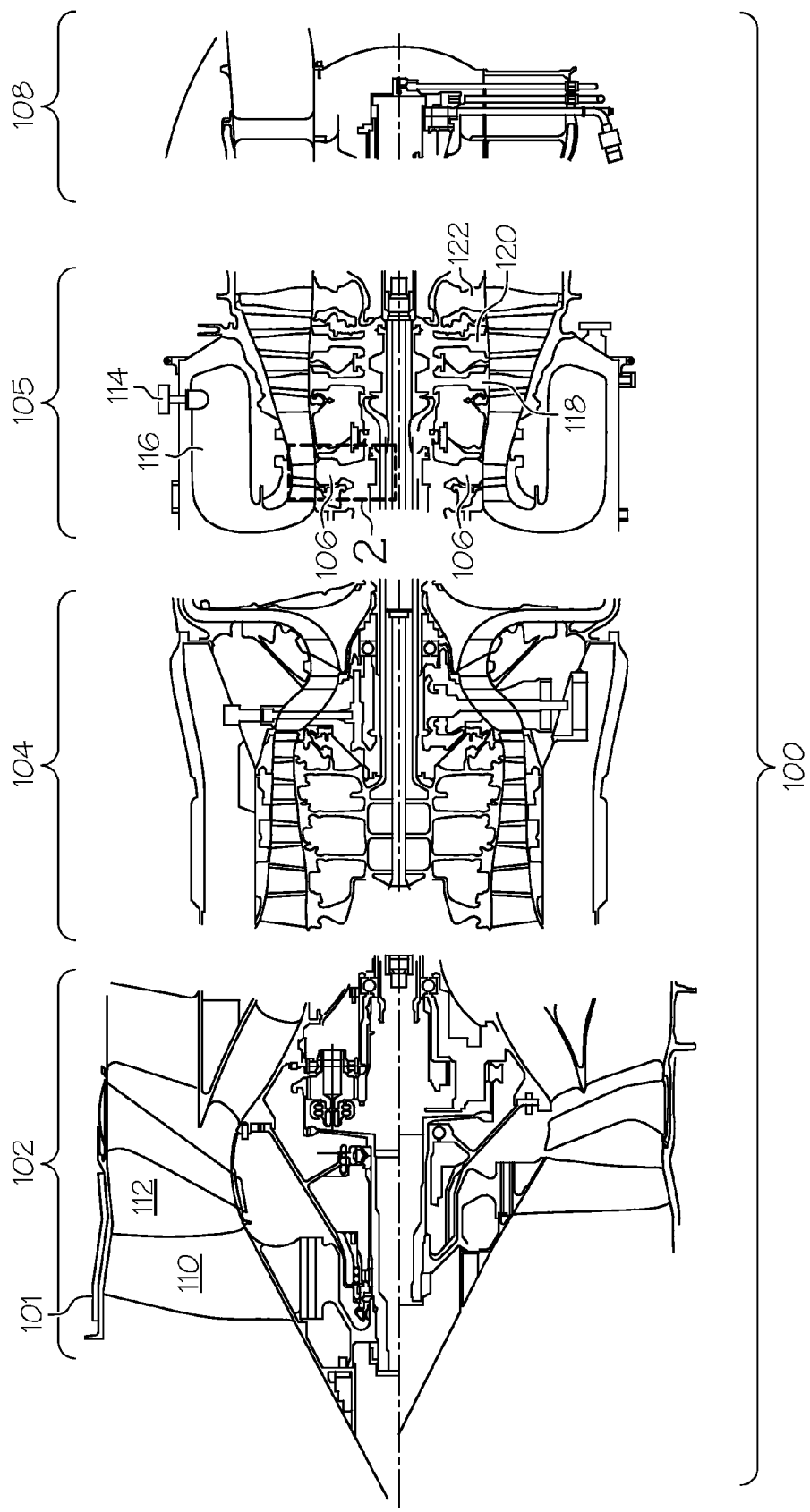
FIG. 1 is a partial cross-sectional side view of a turbofan jet engine, according to an embodiment.

FIG. 1 is a partial cross-sectional side view of a turbofan jet engine 100, according to an embodiment. The turbofan jet engine 100 is disposed in an engine case 101 and includes a fan section 102, a compressor section 104, a combustor and turbine assembly 105, and an exhaust section 108. The fan section 102 is positioned at the front, or "inlet" section of the engine 100, and includes a fan 110 that induces air from the surrounding environment into engine 100. The fan section 102 accelerates a fraction of the air toward the compressor section 104, and a remaining fraction is accelerated into and through a bypass 112, and out the exhaust section 108. The compressor section 104 raises the pressure of the air it receives to a relatively high level.

The high-pressure compressed air enters combustor and turbine assembly 105, where a ring of fuel nozzles (not shown) injects fuel into a combustor 116. Combustion is initiated by an igniter 114 which ignites the fuel in the high-pressure air to significantly increase the thermal energy of the air. This high-temperature, high-pressure air flows into a cooled high pressure turbine stage 106 and into un-cooled low pressure turbine assemblies 118, 120, 122, causing the turbines to rotate as air flows over radially mounted turbine blades, thereby converting thermal energy from the air into mechanical energy. Although three low pressure turbine assemblies are shown in FIG. 1, fewer or more assemblies may be included in other embodiments.

The mechanical energy generated in the low pressure turbine assemblies 118, 120, 122 is used to power other portions of engine 100, such as the fan section 102 and axial stages of the compressor section 104. Air exiting the last turbine assembly 122 then leaves the engine 100 via the exhaust section 108. Energy remaining in the exhaust air augments thrust generated by the air flowing through the bypass 112.

Figure 2:
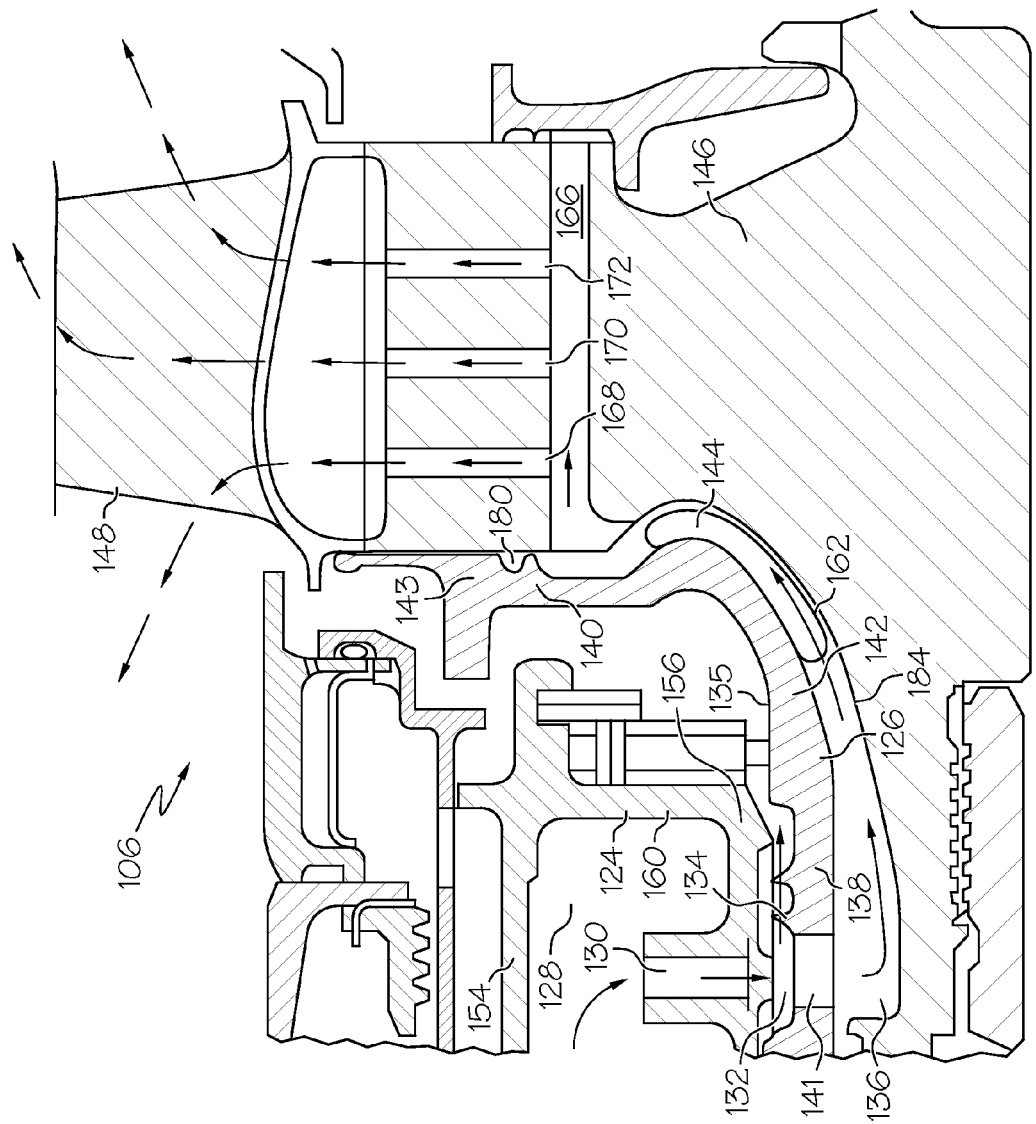
FIG. 2 is a close-up, cross-sectional view of a portion of the turbofan jet engine of FIG. 1 indicated by dotted line 2, according to an embodiment.

FIG. 2 is a cross-sectional view of a portion of the turbofan jet engine 100 of FIG. 1 indicated by dotted box 2, according to an embodiment. With reference to FIGS. 1 and 2, to allow turbine stage 106 to operate as intended when exposed to the high-temperature, high-pressure air from the combustor and turbine assembly 105, certain components of turbine stage 106 may be cooled. In this regard, the turbine stage 106 may include an assembly having a tangential onboard injector ("TOBI") 124 and a seal plate 126, both of which are configured to direct relatively cool air ("cooling air") from a cool air source, such as the compressor section 104, toward a turbine disk 146. In an embodiment, the TOBI 124 is annular and surrounds a portion of the turbine disk 146. According to a particular embodiment, the TOBI 124 may include an outer annular ring 154 and an inner annular ring 156 that are spaced apart from each other to form a flow cavity 128 for receiving the cooling air from the cool air source. In another embodiment, one or more holes or passages 130 may be formed through the inner annular ring 156. The holes or passages 130 may provide communication between the flow cavity 128 and a first cavity 132 formed between the inner annular ring 156, an axial wall 160 connecting the outer annular ring 154 and the inner annular ring 156, and an outer radial surface 135 of the seal plate 126. Although a single passage 130 is shown in FIG. 2, alternatively, more holes or passages may be employed. For example, a plurality of passages may be included around a circumference of the inner annular ring 156. In an embodiment, the inner annular ring 156 may include from six to thirty passages. In other embodiments, more or fewer passages may be included. In any case, to prevent excessive leakage of cooling air from the first cavity 132, a seal 134, such as a labyrinth seal may be mounted on seal plate 126.

As alluded to briefly above, the seal plate 126 is mounted between the TOBI 124 and the turbine disk 146. In an embodiment, the seal plate 126 is spaced apart from the turbine disk 146 to form a second cavity 136. The seal plate 126 may include a hub having a tubular section 138 and an annular flange section 140. According to an embodiment, the tubular section 138 may have one or more openings 141 that may be substantially radially aligned with the passages 130 of the TOBI 124 to receive a portion of the cooling air. In an embodiment, the openings 141 may extend substantially perpendicularly (e.g., ±5°) to a centerline 182 through the seal plate 126. Additionally or alternatively, one or more of the openings 141 may be angled relative to the centerline. In still another embodiment, one or more of the openings 141 may be angled relative to a direction of rotation of the turbine disk 146 such that entry and turning loss of the flow of the cooling air is reduced.

The annular flange section 140 flares radially outwardly relative to the tubular section 138, in an embodiment. In accordance with an embodiment, the annular flange section 140 defines a flow surface and has a radially inward section 142 that may extend radially outward from the tubular section 138 at a curve. In an example, the curvature of the radially inward section 142 may have a contour that corresponds to that of an outer surface of the turbine section 138, while maintaining a space therebetween to define the second cavity 136. A radially outward section 143 of the annular flange section 140 may be configured to retain blades 148 in the disk 146. In an embodiment, the annular flange section 140 may be configured such that the radially outward section 143 contacts the blades 148. In another example, the radially outward section 143 may include a seal 180, such as a wire seal, that may maintain air along the flowpath of the second cavity 136 so that the air may be directed into blade slot openings 166 of the blades 148.

To increase air pressure of cooling air to thereby encourage the cooling air into the blade slot openings 166 between the disk 146 and the blades 148, the seal plate 126 may include one or more pumping vanes 144, in an embodiment. In an embodiment, the pumping vanes 144 may extend along the annular flange section 140 of the seal plate 126. According to an embodiment, the pumping vanes 144 may extend along the radially inward section 142 of the annular flange section 140, such as along a curved portion of the radially inward section 142. The pumping vanes 144 may extend axially from seal plate 126 toward turbine disk 146 to provide a clearance with a surface of the turbine disk 146. In an embodiment, the clearance may be configured such that a minimal amount of cooling air passes between an edge 162 of the pumping vane 144 and the surface 184 of the turbine disk 146 without contacting the turbine disk 146 during operation. For example, the clearance may be in a range of about 0.5 millimeters (mm) to about 2.0 mm. In other embodiments, the clearance may be greater or less than the aforementioned range.

Although a single pumping vane 144 is shown in FIG. 2, more pumping vanes 144 may be included. For example, a total of thirty-six (36) pumping vanes 144 may be arranged circumferentially around the seal plate 126. In other embodiments, more or fewer may be included. Moreover, although the pumping vane 144 is shown in FIG. 2 as having a particular configuration, some of the pumping vanes 144 may not have the same configuration as an adjacent pumping vane.

Figure 3:
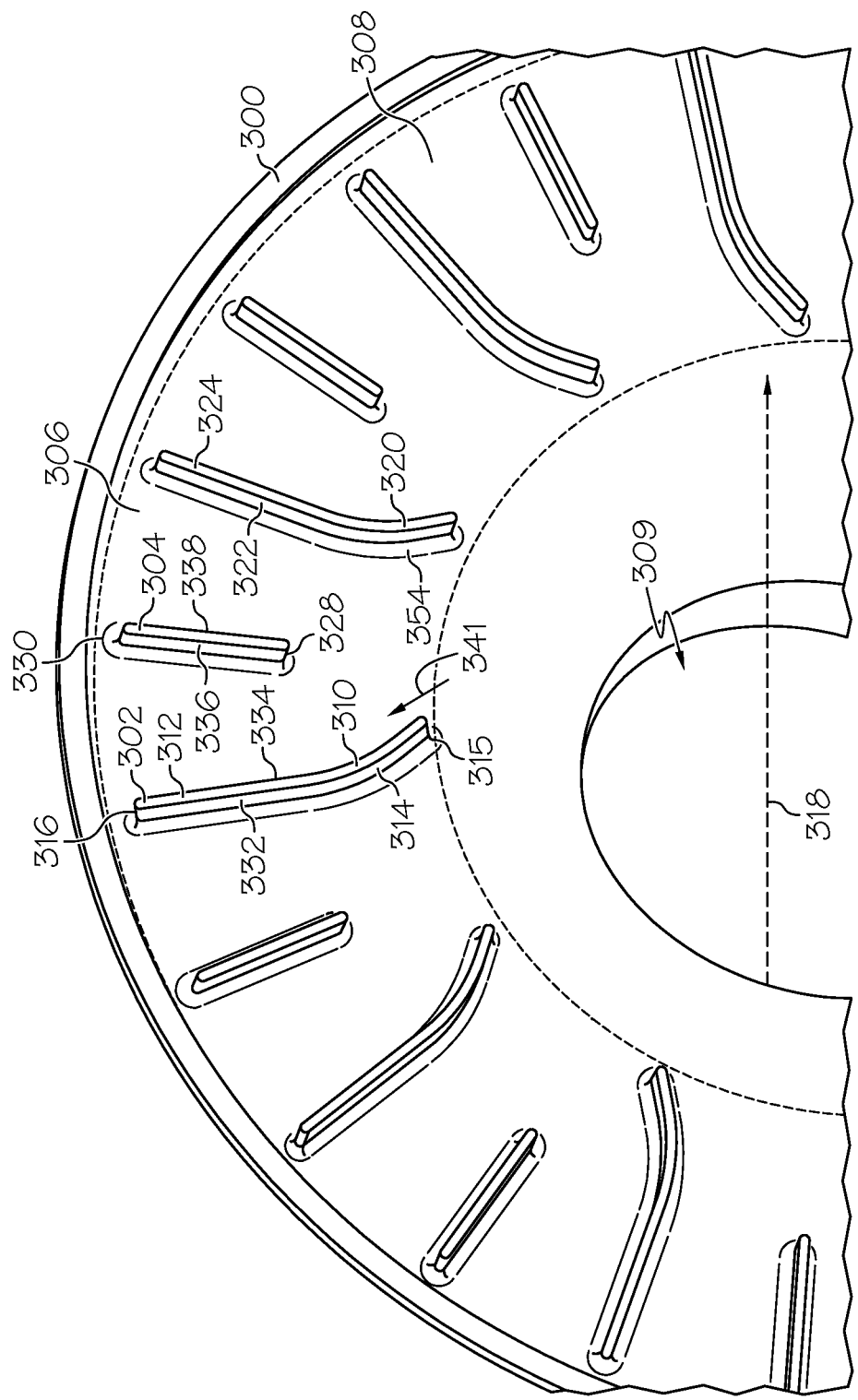
FIG. 3 is a perspective view of a portion of a turbine, according to an embodiment.

FIG. 3 is a portion of a seal plate 300 including pumping vanes 302, 304, 322 according to an embodiment. In this example, the pumping vanes 302, 304, 322 include a plurality of main pumping vanes 302, 322 and a plurality of splitter vanes 304, where each type of vane 302, 304, 322 has a different configuration. The vanes 302, 304, 322 may be formed on the seal plate 300 or may be separately manufactured and brazed, welded or otherwise coupled to the seal plate 300. Though not illustrated, the main pumping vanes 302, 322 and the splitter vanes 304 are disposed circumferentially on a flow surface 306 of an annular flange section 308 of the seal plate 300. According to an embodiment, the main pumping vanes 302, 322 and the splitter vanes 304 are positioned such that, when adjacent to a turbine disk (such as turbine disk 146 of FIG. 2), the vanes 302, 304, 322 may be circumferentially clocked with respect to blade slot openings (e.g., openings 166) in the disk. Moreover, in an embodiment, the total number of blades is an integer that is a low order multiple of the total number of main pumping vanes 302, 322 and splitter vanes 304. For example, in an embodiment in which the turbine disk includes thirty-six blades, the seal plate 300 may include eighteen (18) main pumping vanes and eighteen (18) splitter vanes. In another embodiment, the seal plate 300 may include nine (9) main pumping vanes and nine (9) splitter vanes. In still another embodiment, the seal plate 300 may include six (6) main pumping vanes and twelve (12) splitter vanes. In still yet another embodiment, the seal plate 300 may include nine (9) main pumping vanes and twenty-seven (27) splitter vanes. In other embodiments, more or fewer vanes may be included relative to the total number of blades.

In an embodiment, the main pumping vanes 302, 322 are substantially uniformly spaced (e.g., ±0.5 mm) around the seal plate 300. The circumferential placement of each main pumping vane 302, 322 may depend on particular positioning of adjacent turbine blades. The optimal relative circumferential positioning of the pumping vanes 302, 322 and the blade slots 166 is determined by utilizing computational fluid dynamics (CFD) analysis to optimize the blade inlet supply pressure. In an example as shown in FIG. 3, the seal plate 300 may be configured such that four turbine blades are disposed between adjacent main pumping vanes 302, 322. In other embodiments, the seal plate 300 may be configured such that more or fewer turbine blades may be positioned between adjacent main pumping vanes 302, 322.

Each main pumping vane 302, 322 has a canted section 310, 320 and a straight section 312, 324. Although described with reference to a first main pumping vane 302, the canted section 320 and straight section 324 of other main pumping vanes, such as main pumping vane 322 may be configured in a similar manner to the canted section 310 and the straight section 312 of the first main pumping vane 302. In any case, the canted section 310 may be located radially inward relative to the straight section 312 and may define a leading edge 314 that is aligned with a direction of an incoming cooling airflow (e.g., indicated by arrow 341). For example, the canted section 310 may be angled in a circumferential direction relative to a radially inward direction which passes through a centerline 318 that is perpendicular to the flow surface 306 of the seal plate 300 and that extends through a central opening 309 of the seal plate 300. In an embodiment, the canted section 310 may be disposed at an angle in a range of about −30 degrees to about +30 degrees in the circumferential direction relative to the radially inward direction. Said another way, the canted section 310 may be angled relative to a first plane which includes the centerline 318, and the canted section 310 may be disposed at an angle in a range of about −30 degrees to about 30 degrees relative to the first plane. An optimal relative circumferential positioning of the canted section 310 may be determined by utilizing computational fluid dynamics (CFD) analysis to minimize an incidence angle of the cooling airflow with respect to a inner radial end 315 of a leading edge 314 of the canted section 310 of the vane 302 to optimize a blade inlet supply pressure. In other embodiments, the angle may be greater or less than the aforementioned range. According to an embodiment, the straight section 312 lies in the radially inward direction (for example, in a first plane) which passes through the centerline 318. Similarly, the straight sections of other main pumping vanes (e.g., straight section 324 of vane 322) may lie in other second planes that include the centerline 318, but that are angularly offset, around the centerline 318, from the first plane.

The canted section 310 and the straight section 312 may be substantially equal in axial length (e.g., ±0.5 mm), in an embodiment. In an example, the length of the canted section 310 may be in a range of about 0.5 to about 5 cm, and the length of the straight section 312 may be in a range of about 1 to about 5 cm. In another embodiment, the canted section 310 may be longer or shorter than the straight section 312, depending on a particular configuration of a platform surface of the blade (e.g. blade 148 of FIG. 2).

According to an embodiment, each main pumping vane 302, 322 has a substantially uniform height (e.g., ±0.5 mm) along its length. In another embodiment, each main pumping vane 302, 322 may have a height that varies along its length to follow the surface 184 of the disk 146. For example, each main pumping vane 302, 322 may be shorter at an inner radial end 315 than at an outer radial end 316. In any case, the main pumping vanes 302, 322 may have heights in a range of about 2 mm to about 5 mm, in an embodiment. In other embodiments, the heights may be greater or less than the aforementioned range. In still other embodiments, all of the main pumping vanes 302, 322 have the same configuration and heights. In other embodiments, two or more of the main pumping vanes 302, 322 may vary in configuration and/or height.

The plurality of splitter vanes 304 are positioned circumferentially on the flow surface 306 of the annular flange section 308 of the seal plate 300 such that at least one splitter vane 304 is disposed between the straight sections 312, 324 of two adjacent main pumping vanes 302, 322, in an embodiment. In accordance with an embodiment, the splitter vanes 304 lie along radial lines that pass through the centerline 318, but that are not in the same circumferential positions in which the straight sections 312, 324 of the main pumping vanes 302, 322 are disposed (i.e., the splitter vanes 304 lie in planes that include centerline 318, but that are not angularly offset, around centerline 318 for the first planes in which the straight sections 312, 324 are disposed). In an embodiment, the splitter vanes 304 are substantially equal in length to the straight sections 312, 324 of the main pumping vanes 302, 322. In another embodiment, the splitter vanes 304 may be shorter than the straight sections 312, 324 of the main pumping vanes 302, 322. For example, the splitter vanes 304 may have a length in a range of about 0.5 cm to about 10 cm, and the straight sections 312, 324 of the main pumping vanes 302, 322 may have a length in a range of about 1 cm to about 10 cm. In other embodiments, the lengths may be greater or less than the aforementioned ranges. In still other embodiments, the splitter vanes 304 may be longer in length than the straight sections 312, 324 of the main pumping vanes 302, 322. In still other embodiments, inner radial end 328 of the splitter vanes 304 may be angled in the circumferential direction similar to that of the canted section 310 of the main pumping vane 302. In this configuration, the canted section 310 of the splitter vane 304 is parallel to the canted section 310 of the main pumping vane 302. The optimal relative circumferential positioning of the canted sections of the splitter vanes 304, if included, may be determined by utilizing computational fluid dynamics (CFD) analysis to minimize an incidence angle of the cooling airflow with respect to the inner radial end 328 of the canted section of the splitter vanes 304 to optimize the blade inlet supply pressure.

According to an embodiment, in which one splitter vane 304 is disposed between two adjacent main pumping vanes 302, 322, the splitter vane 304 may be positioned substantially equidistant (e.g., ±0.5 mm) from each main pumping vane 302, 322. In another embodiment, the splitter vane 304 may be disposed closer to a second main pumping vane 322 than to a first main pumping vane 302. The proximity of the splitter vane 304 relative to the first or second main pumping vane 302, 322 may depend on the positioning of the blades on the turbine disk and/or on the angles at which the canted sections 310, 320 of the two main pumping vanes 302, 322 are canted. In an example in which four blades are disposed between two adjacent main pumping vanes 302, 322 and the canted sections 310, 320 of each of the first and second main pumping vanes 302, 322 are equally spaced in the circumferential direction, the splitter vane 304 may be positioned closer to the second main pumping vane 322 to minimize flow separation on a suction side 354 of main pumping vane 322. In another example, the blades, turbine disk, and the main pumping vanes of the seal plate may be mathematically modeled and subjected to a CFD analysis to determine particular placements of the splitter vanes 304 around the seal plate, which maximize the pumping pressure rise and minimize pressure losses into the blade slots 166 (FIG. 1).

According to an embodiment, each splitter vane 304 has a substantially uniform height along its length. In another embodiment, each splitter vane 304 may have a height that varies along its length to follow the surface 184 of the disk 146. For example, the splitter vane 304 may be shorter at an inner radial end 328 than at an outer radial end 330. In any case, the splitter vanes 304 may have heights in a range of about 2 mm to about 10 mm, in an embodiment. In other embodiments, the heights may be greater or less than the aforementioned range. In still other embodiments, all of the splitter vanes 304 have the same configuration and heights. In other embodiments, two or more of the splitter vanes 304 may vary in configuration and/or height.

In another embodiment, the main pumping vanes 302, 322 and splitter vanes 304 have substantially uniform heights. In another embodiment, the heights of the main pumping vanes 302, 322 may be greater or less than the heights of the splitter vanes 304. For example, the main pumping vanes 302, 322 may be about 0.5 mm to about 1.0 mm taller than the splitter vanes 304. In other embodiments, the heights of the main pumping vanes 302, 322 may greater or less than the aforementioned range.

Additionally, in an embodiment, the main pumping vanes 302, 322 and splitter vanes 304 may have uniform thicknesses measured between a first wall 332, 336 and a second wall 334, 338 of each. For example, the thicknesses may be in a range of about 0.5 mm to about 2.0 mm. In another embodiment, the thicknesses may be greater or less than the aforementioned range. In still other embodiments, the thicknesses may vary along the height of the main pumping vanes 302 and splitter vanes 304. For example, the thickness of one or more of the main pumping vanes 302 and splitter vanes 304 may be thicker at locations closer to the flow surface 306 and thinner at locations furthest away from the flow surface 306.

Returning to FIG. 2, during engine operation, cooling air enters the flow cavity 128 at a relatively high Mach number (e.g., between about 0.5 and 1.0 Mach). Next, the air flows into the one or more passages 130 of the TOBI 124 and then into the first cavity 132. A portion of the air is directed into the one or more opening 141 formed in the seal plate 126. With additional reference to FIG. 1, the cooling air is then directed through the second cavity 136 in between the pumping vanes 144 (e.g., main pumping vanes 302, 322 and splitter vanes 304 of FIG. 3). The air flows along the leading edge of the canted sections 310, 320 to a space between the two adjacent main pumping vanes 302, 322. While in the space, the air is further divided by the shorter splitter vanes 304 and directed into sub-spaces between each splitter vane 304 and the main pumping vanes 302, 322. Next, the divided air flows into blade attachment slots 166 between the turbine disk 146 and the turbine blade 148, through internal cooling passages 168, 170, 172 and toward the turbine blade 148.

By configuring the canted sections of the main pumping vanes to include leading edges that are aligned with an incoming flow direction 341, pressure losses associated with high incidence are reduced. This more closely aligns the cooling flow direction with the leading edges 314 of the main pumping vanes 302, which reduces flow separation on the suction side 354 of the pumping vane and increases blade inlet supply pressure. In other embodiments, the inner radial end 328 of the splitter vanes 304 may be angled in the circumferential direction similarly to that of the canted section 310 of the main pumping vane 302. Additionally, by including the straight sections of the main pumping vanes and the splitter vanes in the radial direction that passes through the centerline, additional momentum may be imparted to the airflow that has flowed through the canted section such that a tangential velocity of the airflow may be substantially equal to a rotational speed of the disk during operation. As a result, entrance losses associated with the airflow into the blade attachment slots may be minimized. Moreover, because the vanes are clocked relative to the blades, blade to blade cooling flow rate variation may be minimized. Accordingly, the turbine disk may be more efficiently cooled as compared to a turbine disk disposed in an engine including a conventional cooling scheme. While all embodiments of the inventive subject matter presented above feature pumping vanes and splitter vanes that reside solely on the seal plate, alternatively, the vanes could also be disposed solely on the disk. Alternatively, some of the pumping and/or splitter vanes could be disposed on the seal plate, while the remaining pumping and/or splitter vanes may be disposed on the disk. Additionally, one or more partial splitter and/or pumping vanes could be disposed on the seal plate, while the remaining portions of the splitter and/or pumping vanes may be disposed on the disk.

An improved blade cooling configuration has now been provided that may be used to cool blades in turbine engines. The improved blade cooling configuration may be relatively simple and inexpensive to employ as compared to conventional blade cooling scheme. Moreover, the improved blade cooling configuration may be retrofitted into existing engines by exchanging a conventional seal plate with a seal plate having the above-described features.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A seal plate for directing an airflow through a turbine section of an engine, the seal plate comprising:
   a hub having a tubular section and an annular flange section flared outwardly relative to the tubular section, the annular flange section defining a flow surface;
   a plurality of main pumping vanes disposed circumferentially on the flow surface around the annular flange section of the hub, each main pumping vane having a canted section and a straight section, the canted section located radially inward relative to the straight section and aligned with a flow direction of the airflow, and the straight section extending along a first plane including a centerline of the seal plate; and
   a plurality of splitter vanes disposed circumferentially on the flow surface around the annular flange section of the hub such that at least one splitter vane is disposed between the straight sections of two adjacent main pumping vanes, each splitter vane having a length that is less than a length of each of the two adjacent main pumping vanes.

2. The seal plate of claim 1, wherein the plurality of splitter vanes is located in second planes including the centerline of the seal plate, and the second planes are different from the first plane.

3. The seal plate of claim 1, wherein the at least one splitter vane of the plurality of splitter vanes is disposed substantially equidistant from each of the two adjacent main pumping vanes.

4. The seal plate of claim 1, wherein the at least one splitter vane of the plurality of splitter vanes is disposed closer to a second main pumping vane of the two adjacent main pumping vanes than to a first main pumping vane of the two adjacent main pumping vanes.

5. The seal plate of claim 1, wherein the at least one splitter vane is substantially equal in length to each of the straight sections of the two adjacent main pumping vanes.

6. The seal plate of claim 1, wherein each main pumping vane is substantially identical in configuration.

7. The seal plate of claim 1, wherein each splitter vane is substantially identical in configuration.

8. The seal plate of claim 1, wherein each main pumping vane has a height, and the height of each main pumping vane is substantially equal.

9. The seal plate of claim 8, wherein each splitter vane has a height that is substantially equal to the height of each main pumping vane.

10. A turbine section of an engine comprising:
    a seal plate including:
      a hub having a tubular section and an annular flange section flared outwardly relative to the tubular section, the annular flange section defining a flow surface,
      a plurality of main pumping vanes disposed circumferentially on the flow surface around the annular flange section of the hub, each main pumping vane having a canted section and a straight section, the canted section located radially inward relative to the straight section and aligned with a flow direction of an airflow, and the straight section extending along a first plane including a centerline of the seal plate, and
      a plurality of splitter vanes disposed circumferentially on the flow surface around the annular flange section of the hub such that at least one splitter vane is disposed between straight sections of two adjacent main pumping vanes, each splitter vane having a length that is less than a length of each of the two adjacent main pumping vanes;
    a turbine disk spaced apart from the seal plate, the turbine disk having a first side, a second side, an outer radial section, and a plurality of disk slots, the outer radial section including a rim, the plurality of disk slots extending radially inwardly from the rim of the turbine disk; and
    a plurality of blades, each blade of the plurality of blades including a blade attachment portion, each blade attachment portion disposed in a corresponding blade attachment slot such that when the blade is disposed in the corresponding blade attachment slot, a cooling air passage between the blade and the turbine disk is defined.

11. The turbine section of claim 10, wherein the plurality of splitter vanes is located in second planes including the centerline of the seal plate, and the second planes are different from the first plane.

12. The turbine section of claim 10, wherein the at least one splitter vane of the plurality of splitter vanes is disposed substantially equidistant from each of the two adjacent main pumping vanes.

13. The turbine section of claim 10, wherein the at least one splitter vane of the plurality of splitter vanes is disposed closer to a second main pumping vane of the two adjacent main pumping vanes than to a first main pumping vane of the two adjacent main pumping vanes.

14. The turbine section of claim 10, wherein the at least one splitter vane is substantially equal in length to each of the straight sections of the two adjacent main pumping vanes.

15. The turbine section of claim 10, wherein each main pumping vane is substantially identical in configuration.

16. The turbine section of claim 10, wherein each splitter vane is substantially identical in configuration.

17. The turbine section of claim 10, wherein each main pumping vane has a height, and the height of each main pumping vane is substantially equal.

18. The turbine section of claim 17, wherein each splitter vane has a height that is substantially equal to the height of each main pumping vane.

19. The turbine section of claim 10, wherein a total number of blades included in the plurality of blades is an integer that is a low order multiple of a total number of main pumping vanes included in the plurality of main pumping vanes and a total number of splitter vanes included in the plurality of splitter vanes.

* * * * *